144. WOOD-WORKING,
Combined Machines,
Slicing and Shaving,
Converging Knives.

44.

BEST AVAILABLE COPY

2 Sheets, Sheet 1.

J. Crary.

Cutting Shingles.

No. 217. A.I. Patented Feb. 1, 1859

Original Patent—
Nov. 24 1857.

No. 217, in original Letters Patent No. [illegible], *Improved Shingle Machine.*—I claim, first, the use of the knives or guides $d^1$ $d^2$, in combination with the wrists $a^1$ of the shaving knives and the converging grooves and vertical slots, for the purpose of communicating to the knives a combined drawing knife and approximating motion during the process of shaving, substantially as described.

[illegible] the drawing, sheet 1, in connection with the [illegible] D. 10.

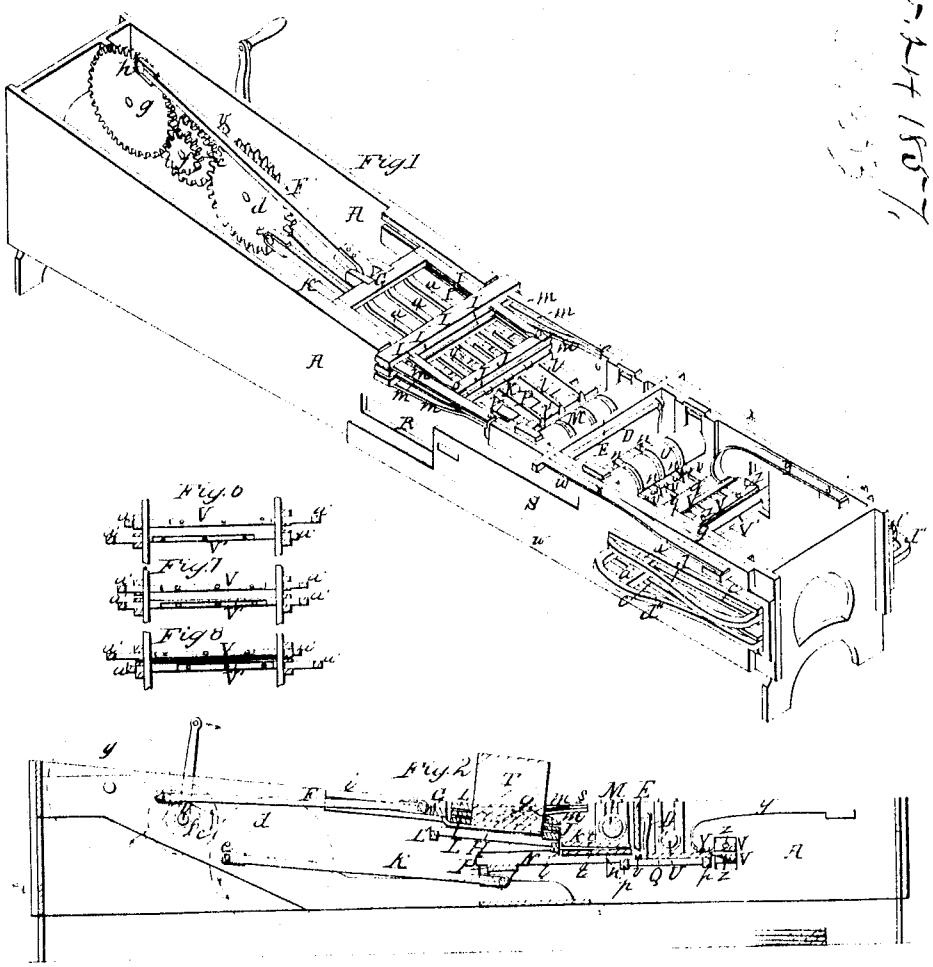

permitted only at a time of the shingle bolts to pass to the shaving knives, and prevent the bolt being drawn back on the retrocession of the feed board.

Third. The use of a feed board composed of elastic bars or fingers, each capable of a slight depression at its extremity, so as to accommodate the surface of the feed board to any unevenness or twist in the shingle bolt.

JAMES CRARY.

Witnesses:
W. F. Lasher
Eli Ripley

Inventor:
James Crary

AM. PHOTO-LITHO. CO. N.Y. (OSBORNE'S PROCESS)

144. WOOD-WORKING,
Combined [illegible]s.
Slicing and [illegible]ing
44. Converging Knives.
BEST AVAILABLE COPY
2 Sheets. Sheet 2.
J. Crary.
Cutting Shingles.
No. 7217. A.D. Patented Feb. 1. 1859.
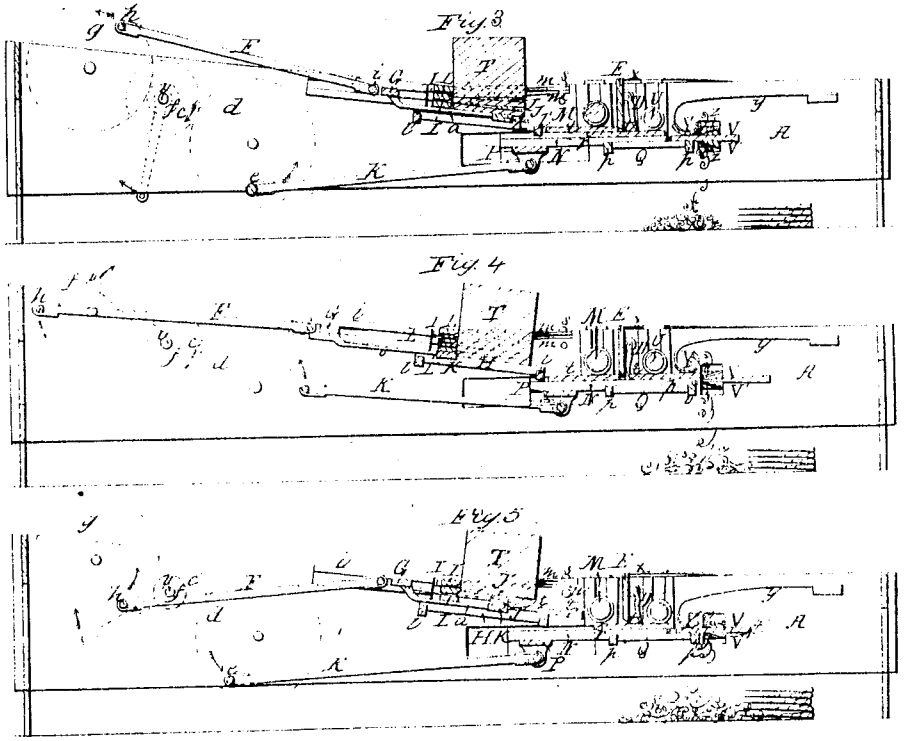
Witnesses:
W. O. Tasker
Eli Ripley
Inventor:
James Crary
AM. PH' ITHO. CO. N.Y. (OSBORNE'S PROCESS)